US011265271B2

(12) United States Patent
Tetreault et al.

(10) Patent No.: US 11,265,271 B2
(45) Date of Patent: Mar. 1, 2022

(54) ELECTRONIC MESSAGE COMPOSITION SUPPORT METHOD AND APPARATUS

(71) Applicant: VERIZON MEDIA INC., New York, NY (US)

(72) Inventors: Joel Tetreault, New York, NY (US); Aasish Pappu, New York, NY (US); Edo Liberty, Or-Yehuda (IL); Liangliang Cao, New York, NY (US); Meizhu Liu, New York, NY (US); Ellie Pavlick, New York, NY (US); Gilad Tsur, Haifa (IL); Yoelle Maarek, Haifa (IL)

(73) Assignee: YAHOO ASSETS LLC, Dulles, VA (US)

( * ) Notice: Subject to any disclaimer, the term of this patent is extended or adjusted under 35 U.S.C. 154(b) by 28 days.

(21) Appl. No.: 16/258,783

(22) Filed: Jan. 28, 2019

(65) Prior Publication Data

US 2019/0158439 A1    May 23, 2019

Related U.S. Application Data

(63) Continuation of application No. 15/059,596, filed on Mar. 3, 2016, now Pat. No. 10,193,833.

(51) Int. Cl.
| | |
|---|---|
| *H04L 12/58* | (2006.01) |
| *G06F 40/169* | (2020.01) |
| *H04L 51/046* | (2022.01) |
| *H04L 51/02* | (2022.01) |
| *G06F 40/232* | (2020.01) |
| *G06F 40/253* | (2020.01) |
| *G06F 40/268* | (2020.01) |
| *H04L 67/02* | (2022.01) |

(52) U.S. Cl.
CPC .......... *H04L 51/046* (2013.01); *G06F 40/169* (2020.01); *G06F 40/232* (2020.01); *G06F 40/253* (2020.01); *G06F 40/268* (2020.01); *H04L 51/02* (2013.01); *H04L 67/02* (2013.01)

(58) Field of Classification Search
CPC ....... H04L 51/046; H04L 51/02; H04L 67/02; G06F 17/241; G06F 17/274
USPC ........................................................ 709/206
See application file for complete search history.

(56) References Cited

U.S. PATENT DOCUMENTS

| | | | | |
|---|---|---|---|---|
| 2008/0208567 | A1* | 8/2008 | Brockett | G06F 40/232 704/9 |
| 2010/0082642 | A1* | 4/2010 | Forman | G06F 16/35 707/749 |
| 2010/0180198 | A1* | 7/2010 | Iakobashvili | G06F 40/232 715/257 |
| 2011/0113320 | A1 | 5/2011 | Neff et al. | |
| 2015/0278196 | A1* | 10/2015 | Dua | G06F 40/30 704/9 |

(Continued)

*Primary Examiner* — David R Lazaro
*Assistant Examiner* — Zia Khurshid
(74) *Attorney, Agent, or Firm* — James J. DeCarlo; Greenberg Traurig, LLP

(57) ABSTRACT

An electronic message composition support system, method and architecture including machine learning and natural language processing techniques for extending message composition capability and support and to provide feedback to a user regarding an error, condition, etc., detected in the user's message before the user sends the message, e.g., while the user is composing the message using a messaging application's user interface.

20 Claims, 12 Drawing Sheets

(56) References Cited

U.S. PATENT DOCUMENTS

2015/0309983 A1* 10/2015 Hoover ................ G06F 40/205
                                                              704/9
2016/0259778 A1*  9/2016 Cookson .............. G06Q 10/107

* cited by examiner

| Feature | Weight | Label |
|---|---|---|
| ate the | -0.5 | deer |
| stood | -0.2 | deer |
| The | -0.1 | deer |
| ran | -0.3 | deer |
| Verb | -0.2 | deer |
| friend | 0.6 | dear |
| friends | 0.3 | dear |
| beloved | 0.2 | dear |
| Proper Noun | 0.2 | dear |
| Sir | 0.4 | dear |

Fig. 6

Did you get my message today? --Joel ⟵ 702

1-grams: ⟵ 704
Did
you
get
my
message
today
?
--
Joel 2-grams: ⟵ 706
Did you
you get
get my
my message
message today
today ?
? --
-- Joel 3-grams: ⟵ 708
Did you get
you get my
get my message
my message today
message today ?
today ? --
? -- Joel

*Sentiment*

| Feature | Weight | Label |
|---|---|---|
| so happy | 0.7 | Positive |
| so sad to | -0.3 | Negative |
| the | 0.02 | Positive (very weakly) |

804

*Satire*

| Feature | Weight | Label |
|---|---|---|
| king is a queen | 0.2 | Satirical |
| dow jones closed | -0.3 | Not Satirical |
| a | 0.01 | Positive (very weakly) |

806

*Abusive / Inflammatory Language*

| Feature | Weight | Label |
|---|---|---|
| freaking pigs | 0.9 | Inflammatory |
| accorded high praise | -0.3 | Not Abusive |
| such that | 0.03 | Positive (very weakly) |

Fig. 8

| Feature Name | Feature Description |
|---|---|
| Case | Number of entirely-capitalized words; binary indicator for whether sentence is lowercase; binary indicator for whether the first word is capitalized. |
| Dependency | One-hot features for the following dependency tuples; Lexical items can be backed off to POS tag: (gov, typ, dep), (gov, typ), (typ, dep), (gov, dep), where gov is a governor, typ indicates a dependency type and dep is a dependent. |
| Entity | Entity types (e.g. PERSON, LOCATION) occurring in the sentence; average length, in characters, of PERSON mentions; Entity types can be represented as one-hot features, e.g., represented as a binary value. |
| Lexical | Number of contractions in the sentence, normalized by length; average word length; average word log-frequency, e.g., according to Google N-gram corpus; average formality score, e.g., as computed by Pavlick and Nenkova (2015). |
| N-Gram | One-hot features for the unigrams, bigrams, and trigrams appearing in the sentence. |
| Parse | Depth of constituency parse tree, normalized by sentence length; number of times each production rule appears in the sentence, normalized by sentence length, and not including productions with terminal symbols (i.e. lexical items). |
| Part Of Speech | Number of occurrences of each POS tag, normalized by the sentence length. |
| Punctuation | Number of '?', '...', and '!' in the sentence. |
| Readability | Length of the sentence, in words and characters; Flesch-Kincaid Grade Level score. |
| Subjectivity | Number of passive constructions; number of hedge words, according to a word list; number of 1st person pronouns; number of 3rd person pronouns; subjectivity, which may be measured, for example and without limitation the TextBlob sentiment module; a binary indicator may be used to indicate whether the sentiment is positive or negative. The counts can be normalized by the sentence length. |
| Word2Vec | Average of word vectors using pertained word2vec embeddings, skipping out-of-vocabulary (OOV) words |

Fig. 9

| Feature | Formal Examples (with weight) | Informal Examples (with weight) |
|---|---|---|
| n-gram | Dear Sir (0.6), I acknowledge that (0.4) | no way (-0.2), kinda (-0.2), heeellzzyeah (-0.7) |
| readability | longer sentences and longer words favored | shorter sentences and shorter words favored |
| Punctuation | . (0.1) | !!! (-0.3), ???? (-0.4) |
| case | number of words | higher number of capitalized letters favored, if sentence is all lowercase, then favored |

Fig. 10

ELECTRONIC MESSAGE COMPOSITION SUPPORT METHOD AND APPARATUS

CROSS REFERENCE TO RELATED APPLICATIONS

This application is a continuation of, and claims priority from, co-pending U.S. Patent Application Ser. No. 15/059,596, filed Mar. 3, 2016, entitled ELECTRONIC MESSAGE COMPOSITION SUPPORT METHOD AND APPARATUS, the entire contents of which are hereby incorporated by reference.

FIELD OF THE DISCLOSURE

The present disclosure relates to electronic, or digital, messaging, and more particularly to tools for facilitating message composition.

BACKGROUND

Electronic mail, or email, messaging, is one of the most commonly used forms of electronic communication. It has become so ubiquitous that it is extremely difficult for a person to engage and interact in the modern world without having an email account.

SUMMARY

While the overall functionality of email has changed markedly since its inception, the functionality of mail composition has remained mostly unchanged. Most mail providers offer not much more than very rudimentary composition capability, which is limited to such things as allowing the user to make font and coloring changes and providing spelling correction. The present disclosure seeks to address failings in the art and to provide took to facilitate electronic message composition. One example of electronic message composition facilitated by embodiments of the present disclosure is electronic mail, or email, message composition. While embodiments of the present disclosure are discussed in connection with email, composition of other electronic message types can be facilitated, including text message composition, etc.

In accordance with one or more embodiments, a method is provided, the method comprising receiving, by a server computing device from a client computing device, content of an electronic message being composed by a user at the client computing device prior to the electronic message being sent by the user; forwarding, by the server computing device, at least a portion of the received electronic message content to a number of linters, each linter using the at least a portion of the received electronic message content to determine whether a condition exists that merits feedback to the user, the number of linters comprising at least one linter to identify a grammatical condition, at least one linter to identify a stylistic condition and at least one linter to identify a functional condition; receiving, by the server computing device, the electronic message content annotated to include feedback identifying at least one condition identified by the number of linters; and forwarding, by the server computing device, the annotated electronic message content for display at the user computing device, the annotated electronic message content being forwarded to replace at least a portion of the electronic message's content displayed at the user computing device.

In accordance with one or more embodiments a system comprises a processor and a storage medium for tangibly storing thereon program logic for execution by the processor, the stored program logic comprising: receiving logic executed by the processor for receiving, from a client computing device, content of an electronic message being composed by a user at the client computing device prior to the electronic message being sent by the user; forwarding logic executed by the processor for forwarding at least a portion of the received electronic message content to a number of linters, each linter using the at least a portion of the received electronic message content to determine whether a condition exists that merits feedback to the user, the number of linters comprising at least one linter to identify a grammatical condition, at least one linter to identify a stylistic condition and at least one linter to identify a functional condition; receiving logic executed by the processor for receiving the electronic message content annotated to include feedback identifying at least one condition identified by the number of linters; and forwarding logic executed by the processor for forwarding the annotated electronic message content for display at the user computing device, the annotated electronic message content being forwarded to replace at least a portion of the electronic message's content displayed at the user computing device.

In accordance with yet another aspect of the disclosure, a computer readable non-transitory storage medium is provided, the medium for tangibly storing thereon computer readable instructions that when executed cause a processor to receive, from a client computing device, content of an electronic message being composed by a user at the client computing device prior to the electronic message being sent by the user; forward at least a portion of the received electronic message content to a number of linters, each linter using the at least a portion of the received electronic message content to determine whether a condition exists that merits feedback to the user, the number of linters comprising at least one linter to identify a grammatical condition, at least one linter to identify a stylistic condition and at least one linter to identify a functional condition; receive the electronic message content annotated to include feedback identifying at least one condition identified by the number of linters; and forward the annotated electronic message content for display at the user computing device, the annotated electronic message content being forwarded to replace at least a portion of the electronic message's content displayed at the user computing device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an illustration of an architecture for used in accordance with one or more embodiments of the present disclosure.

FIG. 2 provides a process flow example for use in accordance with one or more embodiments of the present disclosure.

FIG. 3 provides a screenshot example of feedback provided in accordance with at least one embodiment of the present disclosure.

FIG. 4 provides another screenshot example of feedback provided in accordance with at least one embodiment of the present disclosure.

FIG. 5 provides a process flow for use with a linter that uses a model in making a feedback determination in accordance with one or more embodiments of the present disclosure.

FIG. 6 provides an example of features and corresponding weights for the deer and dear confused word example in accordance with one or more embodiments of the present disclosure.

FIG. 7 provides an example of text from a message and n-grams generated from the text message contents in accordance with one or more embodiments of the present disclosure.

FIG. 8 provides some examples of features and corresponding weights for sentiment, satire and abusive language models for use by corresponding linters in accordance with one or more embodiments of the present disclosure.

FIG. 9 provides a listing of a formality classification feature set example for use in accordance with one or more embodiments of the present disclosure.

FIG. 10 provides some examples of features and corresponding examples of weights which may be used in accordance with one or more embodiments of the present disclosure.

DETAILED DESCRIPTION

Figure 1:
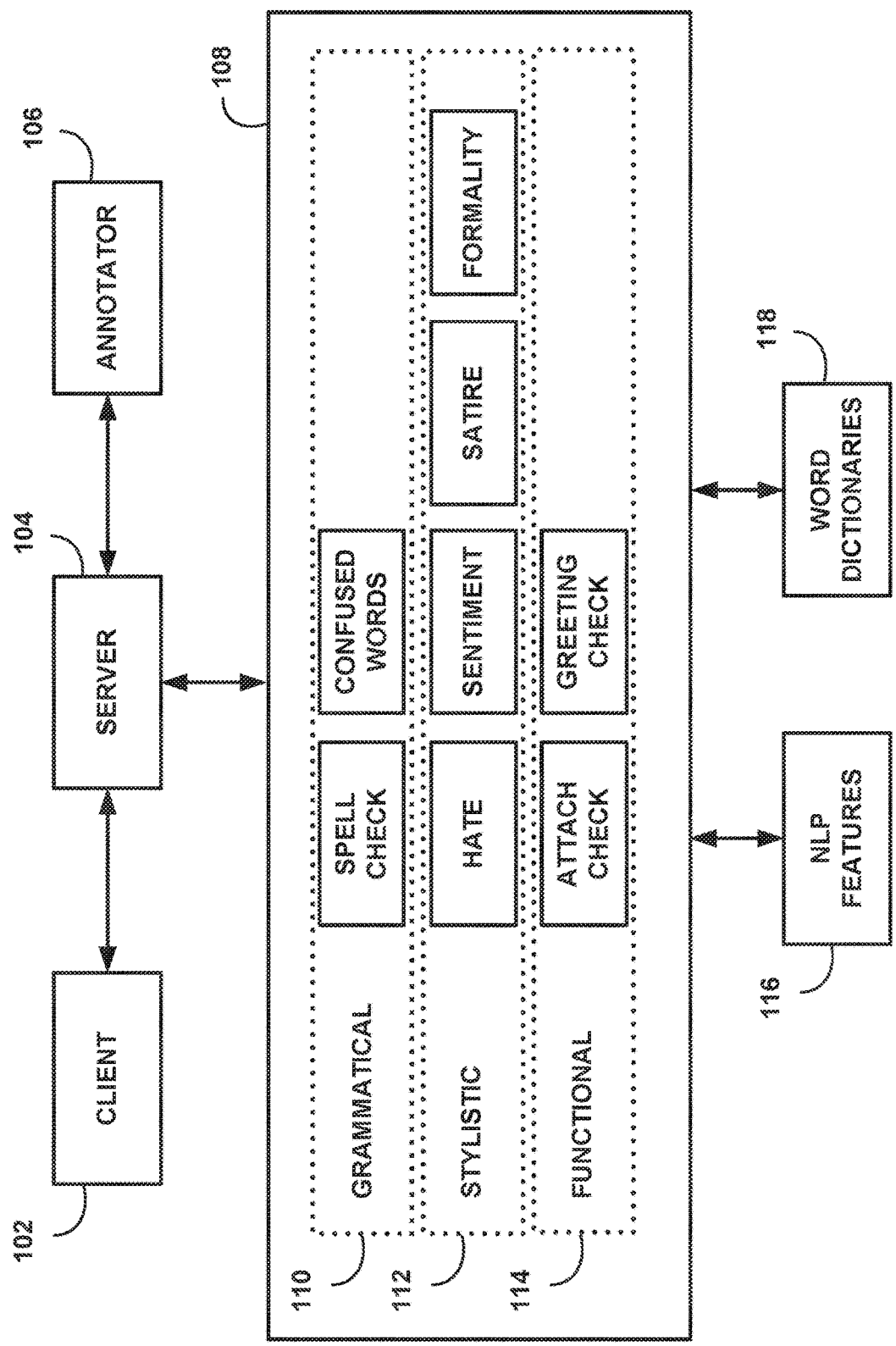

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes an electronic message composition support system, method and architecture. Embodiments of the present disclosure use machine learning and natural language processing techniques to extend message composition capability and support and to provide feedback to a user on any error, condition, etc. detected in the user's message before the user sends the message, e.g., while the user is composing the message using a messaging application's user interface.

Conditions, errors, etc., including commonly-occurring ones, which can be detected and highlighted to the user before the user sends the message include without limitation a missing attachment, typographical errors of a grammatical, spelling or stylistic nature, content the message that may be perceived to be too offensive, inflammatory, etc., or content in the message which may be perceived to be too formal, or too informal, for the message's purpose, recipient or task at hand. An improved user experience is provided and message quality is improved. In addition, feedback provided to the user can improve a user's writing and communicative abilities over time.

In accordance with one or more embodiments, a composition tool is provided, which extends the functionality of an electronic messaging application, such as an electronic mail, or email, messaging application, and which provides composition support. By way of some non-limiting examples, a composition tool is provided which detects conditions, such as and without grammatical, stylistic, functional conditions, errors, etc. The composition tool can detect, and cause feedback to be provided to the user, on a number of different conditions, such as and without limitation attachment errors, abusive content, sarcastic content, naming inconsistencies, e.g., a mismatch between a name used in a greeting and/or body of the message and the message's recipient(s), etc.

FIG. 1 provides an illustration of an architecture for used in accordance with one or more embodiments of the present disclosure. The example shown in FIG. 1 illustrates a client server approach. In the illustrative approach shown in FIG. 1, the client can be a client computing device running a browser application accessing a network mail application executing on a server computing device, the network mail application can be configure to provide, or be in communication with at least one other server computing device configured to provide, composition support in accordance with at least one embodiment. The network mail application can be provided by one or more server computing devices.

Another approach that may be used in connection with one or more embodiments is client computing device executing an electronic messaging client application, e.g., an email client application, which provides composition support in accordance with one or more embodiments of the present disclosure. Other configurations may also be used to provide functionality discussed in connection with one or more embodiments of the present application.

With reference to FIG. 1, the architecture shown can be designed using a modular framework, which facilitates easy integration of new support modules, e.g., new linters. In the example shown in FIG. 1, a server computing device 104, is coupled with a client computing device 102, an annotator 106 and a linter 108. Annotator 106 and linter 108 can be implemented on the same or a different computing device. In the example, annotator 106 and linter 108 are shown as separate components; however, they can be combined to form a single component. One or both of annotator 106 and linter 108 can be integrated into the mail server, which is executed by server computing device 104. Server computing device 104 may comprise one or more server computing devices.

Server 104 can be configured to include a messaging server providing a messaging user interface for display at the client computing device 102. Alternatively, server 104 can be coupled to another server computing device executing a message application configured to provide a messaging user interface to the client computing device 102.

A browser application executing on the client computing device 102 can be used to communicate with the mail server application, which may be executing on the server computing device 104, to display an online mail application web interface, which can be used to access, view, compose, etc. email messages. By way of a non-limiting example, asynchronous communication can be used between server 104 and the client 102. By way of a further non-limiting example, the server 104 and the client can be connected using websockets, and the websocket protocol, which provides a full-duplex communication channel between the server 104 and the client 102.

Linter 108 comprises a number of linters configured to detect an error, or other condition, and to identify feedback to be provided to the user in response to detection of an error, or other condition. In the example shown in FIG. 1, linter 108 includes a number of different types of linters, such as and without limitation grammatical linters 110, stylistic linters 112 and functional linters 114. Each linter is used to detect a type of error, condition, etc., which warrants feedback to the user. Each linter reviews at least a portion of a message, and may use contextual information as well, to determine whether a condition exists, and provides a notification of the condition, if one is found by the linter. Each grammatical linter 110 searches for, and reports on, any detected condition of a grammatical nature, each stylist linter 112 searches for, and reports on, any detected conditions of a stylistic nature, and each functional linter 114 searches for, and reports on, any detected conditions of a functional nature.

By way of some non-limiting examples, grammatical linters 110 can comprise spell check and confused words linters, stylistic linters 112 can comprise hate, sentiment, satire and formality linters and functional linters 114 can comprise attachment check and greeting check linters. Of course other linters can be included in the collection of linters 108. The other linters may be of any type including the grammatical, stylistic and functional types.

In accordance with one or more embodiments, a linter may use one or more word dictionaries 118, such as and without limitation one or more spelling dictionaries, and/or natural language programming (NLP) features 116. By way of a non-limiting example, features 116 may comprise linguistic features. A linter may use a model trained using one or more of features 116 to detect a condition using features 116 of a message. In accordance with one or more embodiments, machine learning performed by a machine learning algorithm operating on a number of training examples can generate a model, or models, used by a linter to detect a condition, or conditions.

By way of a non-limiting example, machine learning may be used to generate a model, such as a hate speech detection model, which can be used to make a prediction, or generate a probability, whether or not the message contains hateful, abusive, etc. content, or content that may be perceived to be hateful, abusive, etc. By way of a non-limiting example, machine learning can be used to generate a hate speech detection model to receive input including a message's features and provide output indicating whether the message's content would be considered by a reader to be abusive, hateful, etc. By way of a further non-limiting example, the hate speech model may be trained using training data comprising examples of content, such as textual content which is considered to be abusive, hateful, etc. and examples of content which is considered to not be abusive, hateful, etc.

In the example shown in FIG. 1, a linter 108 notifies annotator 106 of a detected condition, and the annotator 106 annotates the message with information to identify the condition. By way of a non-limiting example, the linter 108 can provide the annotator 106 with one or more of an informational message to be presented to the user, identify the portion of the message that contains the condition, suggestions to be presented to the user for addressing the condition, e.g., correcting the error, etc. The annotation output from annotator 106 is provided to server 104, which transmits the information to client 102. Client 102 displays the information at the user's computing device, e.g., in a web page displayed by the browser executing on the client 102.

Figure 2:
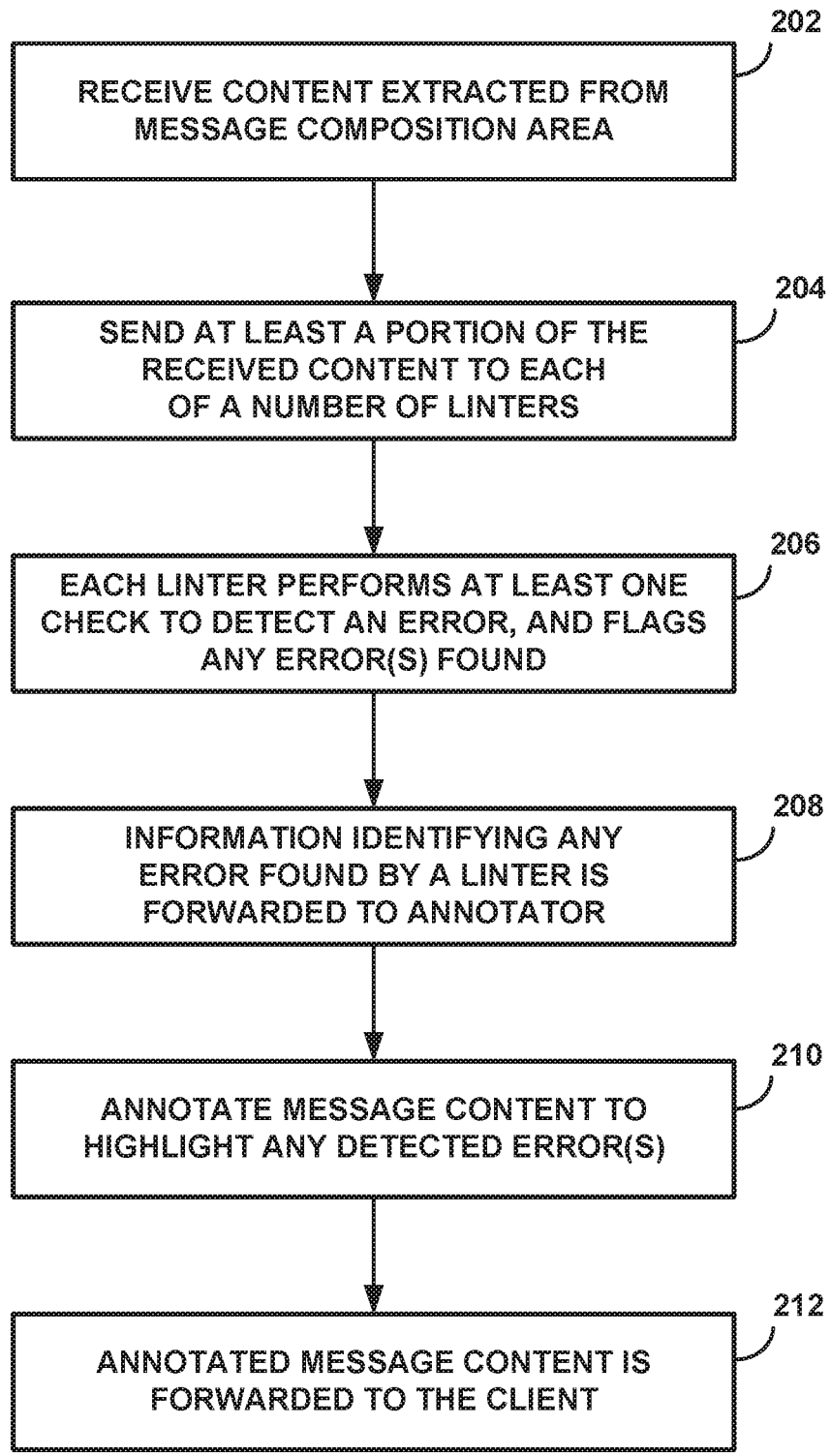

FIG. 2 provides a process flow example for use in accordance with one or more embodiments of the present disclosure. The process flow shown in FIG. 2 may be performed by server 104, for example.

At step 202, content extracted from a message composition area on the client 102 is received. By way of a non-limiting example, software running on the client 102 can be used to extract content from the message composition area and forward it to server 104. The message composition area may comprise any portion of a message being composed by a user, such as and without limitation a sender and recipient information, subject, message body, attachments, etc. Other information, such as and without limitation formatting information may be received by the server 104. A message's content can include text content, image content, audio content, multimedia content, etc.

At step 204, at least a portion of the received content is sent to each of a number of linters 108. By way of a non-limiting example, server 104 can forward some or all of the message's textual content to each of the linters 108. Server 104 may forward other information as well, such as an indicator of whether or not the message has an attachment, the names of the message's recipients, a user's formality preference, etc.

At step 206, each linter receiving information from server 104 performs at least one check to detect whether a condition exists warranting feedback to be sent to the user, and flags any such condition(s) found. By way of a non-limiting example, each linter in a collection of linters 108 may ingest information received from server 104 to produce any error flags using content received from the client 102 via server 104.

At step 208, information identifying any condition found by a linter 108 is forwarded to the annotator 106. At step 210, if any condition is found by a linter 108, the annotator 106 annotates the message content to highlight the detected error(s). At step 212, the annotated message content is forwarded to the client 102.

By way of a non-limiting example, linters 108 can forward information, e.g., flags, identifying any conditions found to server 104, server 104 can aggregate the information and forward it to the annotator 106. Annotator 106 can annotate the message content and forward the annotated message content to server 104, which transmits the annotated message content to the client 102. By way of a further non-limiting example, annotator 106 can generate HTML annotations to highlight parts, e.g., words, sentences, paragraphs, etc. in the message of the raw text. The annotated text can be sent to a mail interface for display at the client 102 via server 104.

By way of some non-limiting examples, the annotator 106 might highlight a condition using special effects on text contained in the user's message, such as and without limitation using a contrasting color, font, font size, brackets, underlining, bolding, italicizing, etc. By way of a further non-limiting example, the annotator 106 may other special effects such as and without limitation including an informational message to highlight a condition found by a linter. The annotator 106 may use any combination of special effects to highlight a condition.

Figure 3:
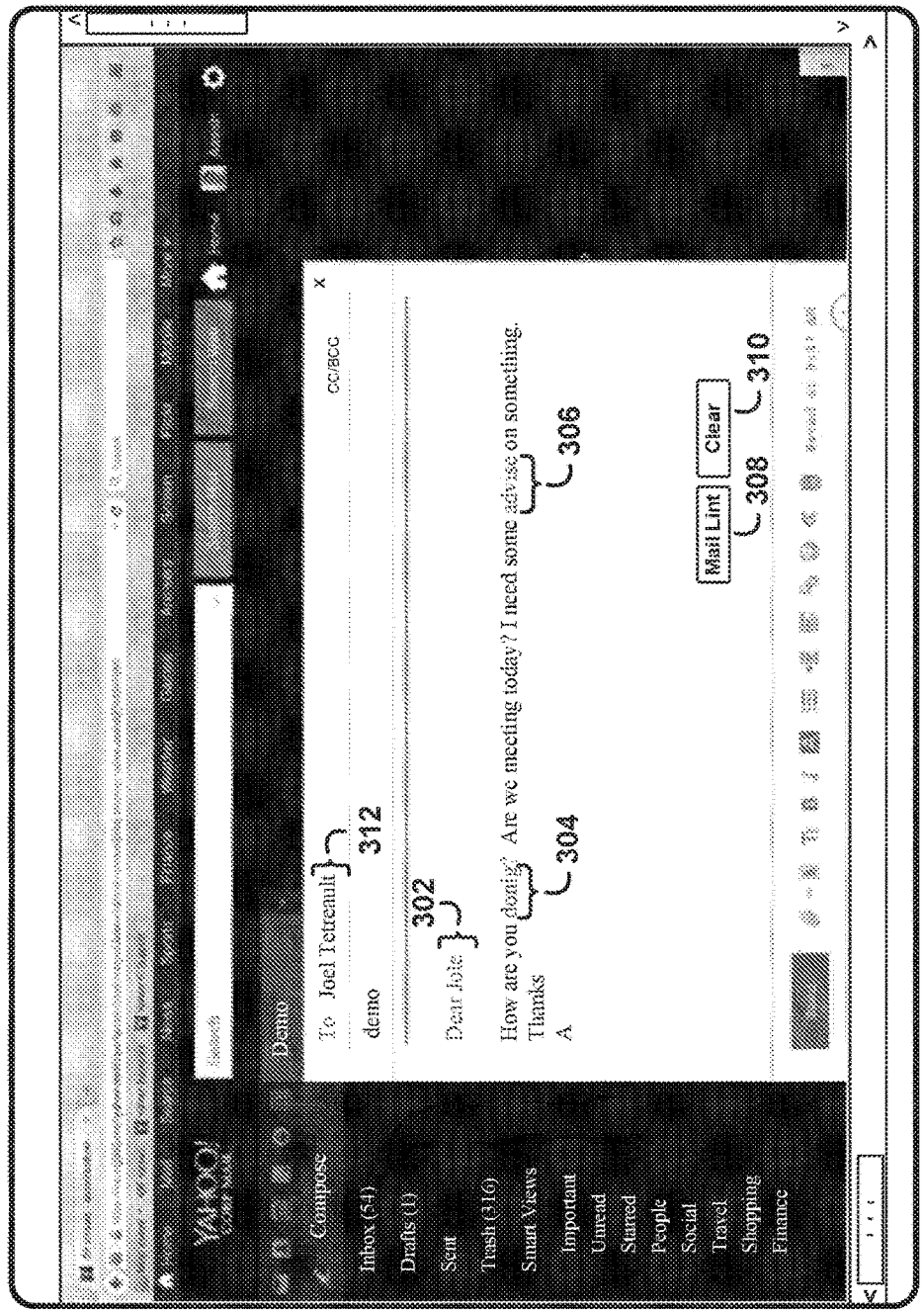
Figure 4:
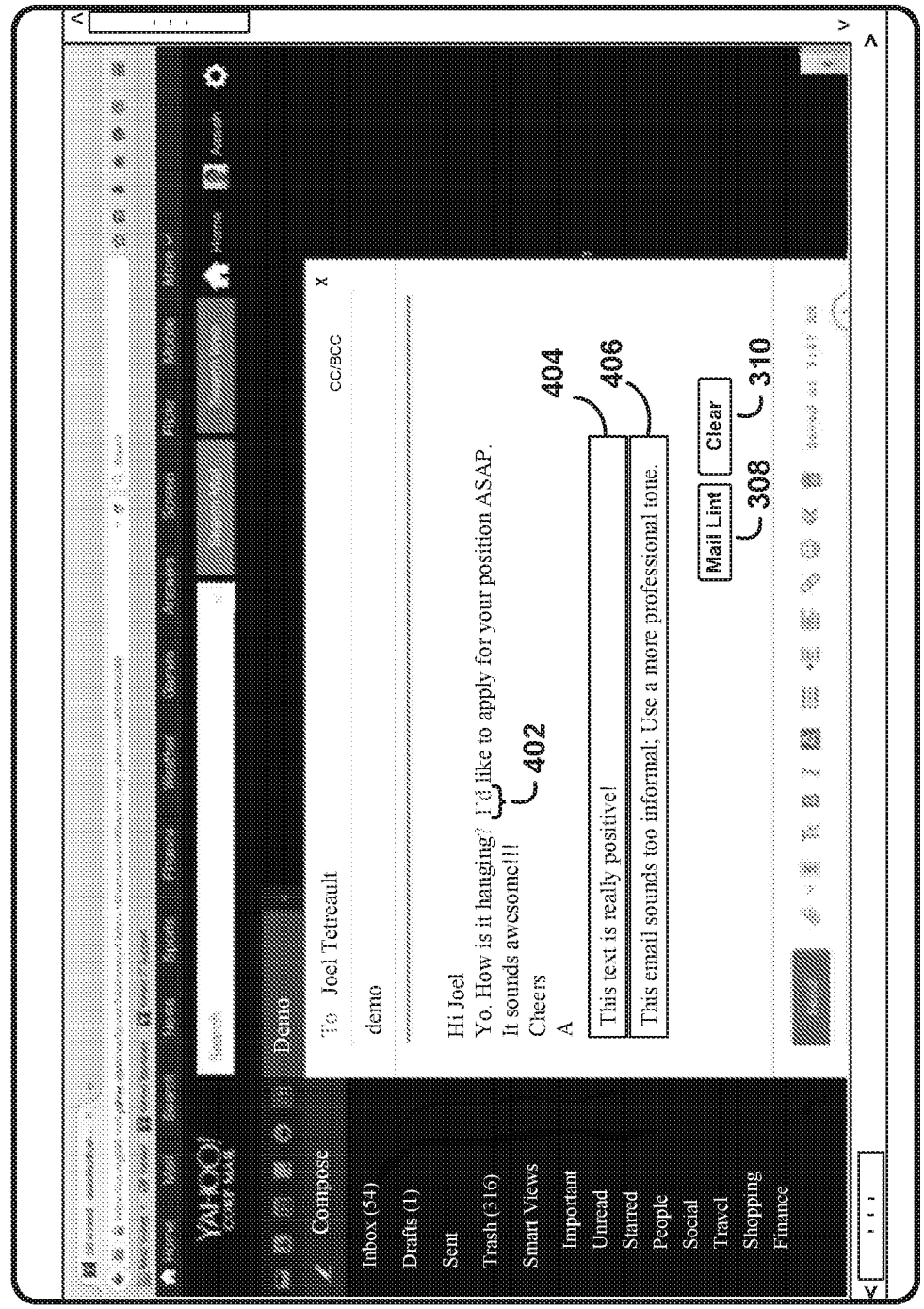

FIGS. 3 and 4 provide screenshot examples of feedback provided in accordance with at least one embodiment of the present disclosure. Referring to FIG. 3, three annotations 302, 304 and 306 are included in the message content displayed in interface 300. Annotations 302, 304 and 306 can be displayed in a color, e.g., red, which contrasts the color used for the remaining content, which might be displayed in black. Annotation 302 highlights a misspelling of the name Joel in the message's greeting, Dear Jole. The spell check linter, which can be a context-sensitive spell checker, identified the spelling error using the recipient name information in the To field 312 of the message. The spell checker detected the discrepancy between the recipient name in the To field 312 and the name used in the greeting by comparing the names used in each location to detect the mismatch and the error condition.

Annotation 304 also highlights a spelling error. The spelling error can be detected by the spell check linter using one or more word dictionaries 118, for example. While the word advise, which is highlighted by annotation 306, is spelled correctly, the spelling of the word is incorrect given the surrounding context. The error condition can be identified by the confused words linter. Annotations 302, 304 and 306 are distinguished from other words in the content, so that the user can easily recognize the errors for correction. In accordance with one or more embodiments, if the user hovers over, e.g., using the mouse or other pointing device, any of annotations 302, 304 and 306, one or more correction suggestions is/are displayed (not shown in screenshot). The user can select a correction suggestion to correct the error. In response, the annotation corresponding to the corrected error is removed.

In accordance with one or more embodiments, the process shown in FIG. 2 can be performed in response to input from the user, e.g., as the user is typing the message. Alternatively, the user can request that the message by checked for errors, e.g., prior to sending the message. In the examples shown in FIGS. 3 and 4, the Mail Lint button 308 can be selected by the user to initiate an error check. Button 310 can be used to clear the annotations from the display.

FIG. 4 provides some examples of annotations generated in response to conditions detected by the formality and sentiment linters. In accordance with one or more embodiments, the formality and sentiment linters can both operate at a document level, and any annotations highlighting errors found by the linters can be posted below the message body in the composition area of display 400, below the portion of the message containing a detected condition, etc.

In the example, from the context of the message, the purpose of the message related to applying for a job, e.g., the user is seeking employment. The tone of a message in which a user is seeking employment is typically more professional than the tone currently being used in the message. Annotation 402 highlights an informality, e.g., the contraction I'd can be replaced with I would. The latter is more formal than the former, and would typically be used in a message in which the user is seeking employment. Annotation 406 provides a message to highlight that the message as a whole is too informal and a more professional tone is desirable given the purpose of the message.

Annotation 404, which is generated in response to information provided by the sentiment linter, indicates that the sentiment of the message is positive. In the example, annotation 404 illustrates that an annotation need not highlight an error condition, but can be used to provide any type of feedback to the user. In the example, the detected condition is intended to provide positive feedback to the user.

Referring again to FIG. 1, linters 108 includes examples of grammatical linters 110, e.g., spell check and confused words linters. As discussed herein, the spell check linter can provide context-sensitive spell correction. By way of a non-limiting example, the spell check linter can use a spellchecking library, such as and without limitation the PyEnchant spell check library.

The confused words linter can provide confused word correction. Confused words are words which sound the same but have different spellings. The words advice and advise discussed in connection with FIG. 3 provide one example of a pair of words that sound similar but have different spellings and meanings. The words dear and deer provide another example.

Confused word instances might arise for a myriad of reasons, such as and without limitation when the user types too quickly, the message composition application incorrectly autocompletes the user's typing input, the user is fatigued, or the user does not know the correct word, and/or spelling of the correct word. As in the spell correction linter above, an error caused by word confusion when writing to peers may not have any consequences; however, such an error in a message directed to a person of authority, for example, could be embarrassing.

In accordance with one or more embodiments, the confused word linter, as well as one or more other linters, use a trained model to make a determination whether or not to provide feedback. The model can be trained by a machine learning algorithm using training data, which comprises a number of training examples represented as features, such as NLP features 116. Once trained, a model can received input, e.g., feature set input, and provide output that can be used by the linter to determine whether a condition exists that warrants feedback to the user. The feature set input can include some of the NLP features 116. The same feature set used to represent each training example can be used to represent the input provided to a linter's model to generate the output used by the linter.

Figure 5:
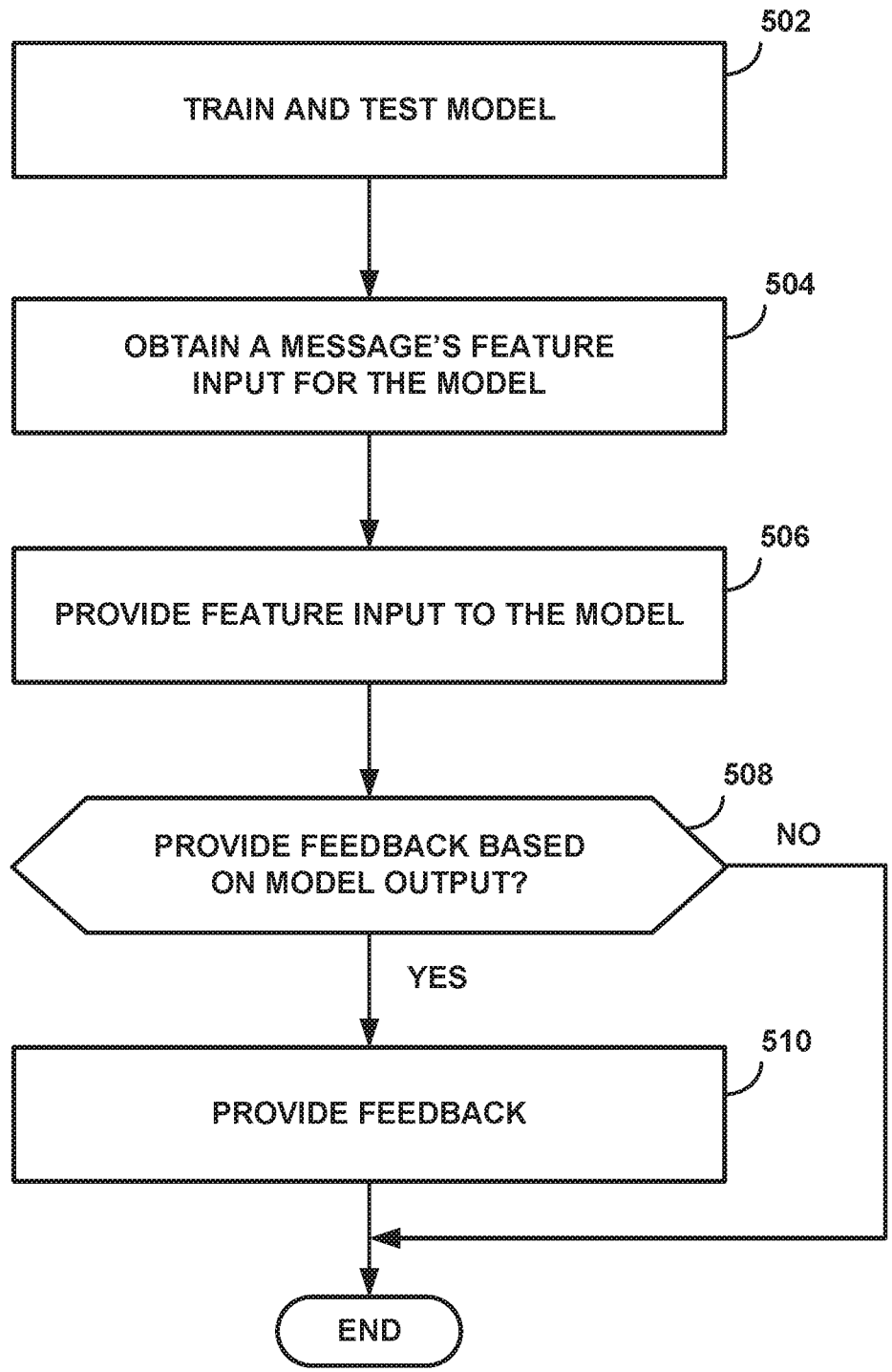

FIG. 5 provides a process flow for use with a linter that uses a model in making a feedback determination in accordance with one or more embodiments of the present disclosure. The process flow example shown in FIG. 5 can be used with linters such as and without limitation hate, sentiment, satire, formality, and confused words linters.

At step 502, a model for a given linter is trained using a training data set. The model can be validated using test data. By way of a non-limiting example, a model is trained using a machine learning algorithm to learn which features in the model's feature set are the most predictive, least predictive, etc. of a certain label. By way of a further non-limiting example, in the case of the formality linter, the machine learning algorithm uses training data including formal and informal examples, each of which is represented using the feature set and a label indicating whether the example is a formal example or an informal example. By way of yet another non-limiting example, a model can be generated using a machine learning algorithm for the sentiment linter using training data including examples of various sentiment levels, each of which is represented using features of a sentiment feature set and a label indicating whether the example expresses high sentiment, low sentiment, etc.

To further illustrate, each model generated using a machine learning algorithm can be tested using test data examples. As with each training data example, each test data example can be represented by features of the feature set used to represent each training data example and by a label indicating the type of example. Unlike the training phase, which uses the label as input to the machine learning algorithm, in the testing phase, the label is not input. Each test data example is input to the model generated by the machine learning algorithm, and the output generated by the model is compared to the test data example's label to determine the accuracy of the model. The model may be regenerated using other or additional training data examples in a case that its accuracy is not acceptable.

If an acceptable level of accuracy exists, the model can be used to identify by the appropriate linter to determine whether or not a condition exists in accordance with one or more embodiments of the present disclosure. At steps 504, 506, 508 and 510, a linter can use the model trained at step 502 to determine whether or not to provide feedback. At step 504, feature input can be obtained, e.g., using the message content received by server 104 from client 102. Examples of the feature input are discussed herein in connection with specific linters. The feature input is provided to the model, at step 506. Output received from the model is used, at step 508, to make a determination whether or not a condition exists that merits feedback to the user. If the linter makes a determination, using the model output, to provide feedback, processing continues at step 510 to provide the feedback. If not, processing ends.

In accordance with one or more embodiments, the confused words linter may use the process flow example shown in FIG. 5. With regard to step 502, a model can be trained for each confused word pair, and the trained model can be used to recognize a confused word instance for the word pair.

By way of one non-limiting example, a number of training examples, e.g., thousands, millions, etc. of examples, can be used as training data for a given pair of confused words. The examples can be obtained from Wikipedia® or another source, or sources, for example. A machine learning algorithm, such as and without limitation Vowpal Wabbit, which provides a supervised classification or learning, may be used to generate a model using the training data for a confused word pairing. The generated model can be used, by a confused word linter, to identify an occurrence of a confused word condition involving the confused word pairing.

Features may comprise a number of n-gram features, where each n-gram feature comprises a number of words to the left and a number of words to the right of a word in the confused word pairing, and a tag for each word in the n-gram indicating the word's part of speech. By way of a non-limiting example, a feature may comprise 5 words to the left and 5 words to the right of the confused word, and each word's part of speech tags. Tokenization and part of speech tags can be derived using a fast natural language process (NLP) toolkit SpaCy, for example. The model may be validated using a test data set, which might be obtained from the same or a different source as the training data set.

By way of a further non-limiting example, assume that the confused words linter uses a trained model for the deer and clear confused word pair. The confused words linter extracts an n-gram from the context surrounding an occurrence of either word. The confused words linter for the word pair extracts a number of words on either side of the occurrence of the word. For example, using the following training example:

John is a deer friend of mine.
the following n-grams, where a maximum of n is set to 3, can be extracted:
 1-grams: John, is, a, friend, of, mine
 2-grams: John is, is a, friend of, of mine
 3-grams: John is a, friend of mine
In addition to the n-grams, "part of speech" (POS) tags can be assigned, each POS tag is associated with a word in the n-gram and indicates the word's POS, e.g., noun, verb, adjective, adverb, etc. For each of the n-grams above, each word can be represented by its POS. For example, the POS representations for each word in the above 3-grams is: Noun Verb Determiner, Noun Preposition Pronoun.

The machine learner can assign weights to the features in the feature set from its analysis of the training examples. In the case of supervised learning, the machine learning algorithm uses each example's respective label as well as the example's features. Features in the feature set that are assigned higher weights, relative to other features in the feature set, by the machine learning algorithm are considered to be more predictive of a label than features with lower weights.

FIG. 6 provides an example of features and corresponding weights for the deer and dear confused word example in accordance with one or more embodiments of the present disclosure. In the example shown in FIG. 6, features with negative weights are more predictive of the deer label. In the example, the the ate feature, which has the highest negative weight, e.g., −0.5, is the most predictive of the deer label, relative to the other features shown in the example. Conversely, features with positive weights are more predictive of the dear label. In the example, the fiend feature, which has the highest positive weight, e.g., 0.6, is the most predictive of the dear label, relative to the other features shown in the example.

In accordance with one or more embodiments, grammatical 110 can comprise a number of confused words linters, each one corresponding to a confused word pair and configured to detect an occurrence of a confused word with respect to a given confused word pair, and to make a suggestion which word of the word pair is likely to be the correct word.

Server 104 can provide the text, e.g., John is a deer friend of mine, to the confused linter. The confused words linter for the deer and dear word pair can determine whether one or the other of the words in the pair is present in the text. If so, the confused words linter can generate features, e.g., n-grains and POS tags, to be input to the confused words model trained for the deer and dear word pair, e.g., at step 506 of FIG. 5. The trained model can use the input to predict which word is the correct word to be used in the text. For example and with reference to step 508, the output of the model can be used to identify whether the correct word is being used in the message. If the correct word is not being used, the confused words linter can flag the condition and indicate the suggested correction, e.g., to replace the current word with the correct word in the message, e.g., at step 510 of FIG. 5.

In the example shown in FIG. 1, stylistic linters 112 includes hate, sentiment, satire and formality linters. The stylistic linters 112 provide feedback on the style of the writer, e.g., the user composing the message.

A sentiment linter can be used to identify the sentiment polarity, such as and without limitation a positive or negative measure, of the user's message. By way of a non-limiting example, a measure can be a real number between −1 and 1. In accordance with one or more embodiments, the sentiment linter may be configured to provide feedback when the measure is close to −1 or 1. Threshold values can be used to indicate the desired closeness.

A satire and sarcasm linter can be used to provide the message composer with feedback alerting the composer/sender that the recipient(s) might not understand the composer's brand of sarcasm or satire. The linter may also be used to provide a message recipient with feedback indicating that the sender was being satirical or sarcastic.

A hate, or abusive language, linter can be used to identify abusive or hateful language. The hate linter can be used to flag the user's message as abusive, hateful, etc. before the user sends the message. The user may be angry or upset when drafting the message. Before sending the message, the user can use feedback from the hate linter indicating that the message is hateful, abusive, etc. to decide not to send the message in its current form.

In accordance with one or more embodiments, the sentiment, satin/sarcasm and hate linters use NLP features 116 and a model. By way of a non-limiting example, the features comprise n-gram features, which are sequences of consecutive words in a message's content. In accordance with one or more embodiments, server 104 receives at least a portion of the message, e.g., an email message. Either the server 104 or the linter can extract varying-length n-grams, e.g., n ranges in value from 1 to a maximum number.

FIG. 7 provides an example of text from a message and n-grams generated from the text message contents in accordance with one or more embodiments of the present disclosure. In the example of FIG. 7, the value of n ranges from 1 to 3. The example further illustrates some examples of the 1-grams 704, 2-grams 706 and 3-grams 708 generated from the text 702.

As discussed in connection with step 502 of FIG. 5, a machine learning algorithm can use the n-gram features for the training example 702, in addition to other training examples, to train a model. The model can be trained using a number of examples, each of which is represented using features and its respective label. The machine learning algorithm generates weights for each of the features in the feature set using the training examples. By way of a non-limiting example, features with higher weights are considered more predictive of a label relative to features having lower weights.

FIG. 8 provides some examples of features and corresponding weights for sentiment, satire and abusive language models for use by corresponding linters in accordance with one or more embodiments of the present disclosure.

With reference to FIG. 8, sentiment features 802 provide some examples of features and their weights. Of the three features listed in the sentiment features 802, the so happy feature is the most predictive of a positive label, e.g., a positive sentiment expression, the feature is the next most predictive of a positive sentiment and so sad to is the most predictive of a negative sentiment expression. In the example, the weight associated with the the feature indicates that while it is predictive of a positive sentiment, it is a very weak indicator of a positive sentiment.

With respect to the satire features 804, of the three features shown in the example, the king is a queen feature is the most predictive of satire and the dow jones closed feature is least predictive of satire, in other words, the least satirical. In the example, the weight associated with the a feature indicates that while it is predictive of a positive label, it is a very weak indicator of the positive label.

In the example shown in FIG. 8, of the three features listed in the abusive, or inflammatory, language feature set 806, the freaking pigs feature is the most inflammatory and the accorded high praise feature is not abusive. In the example, the weight associated with the such that feature indicates that while it is predictive of a positive label, it is a very weak indicator of the positive label.

Referring again to FIG. 5, each sentiment, satire and hate linter obtains, e.g., generates, features for a message's content at step 504, and provides the feature input to its respective trained model, at step 508. The linter uses its model's output to make a determination, at step 508, whether a condition exists meriting feedback to the user. If so, the linter provides the feedback to the annotator 106, at step 510.

In accordance with one or more embodiments, a formality linter can be used to help users calibrate the register of a message by informing the user when the message contains informal, unprofessional, etc. language. In accordance with one or more embodiments, the formality linter comprises a supervised statistical classification model to identify informality occurrences in a message, such as and without limitation word choice, non-standard punctuation and capitalization, etc.

The formality classification model, or formality model, which can be trained at step 502 of FIG. 5, can be trained using a training data set comprising a number of training data examples. Each example can be represented using a number of features, e.g., features from NLP features 116, and one or more labels. FIG. 9 provides a listing of a formality classification feature set example for use in accordance with one or more embodiments of the present disclosure. As illustrated in the example shown in FIG. 9, the feature set can comprise such features as case, dependency, entity, lexical, n-gram, parse, POS, readability, subjectivity and word2vec. Features other than those discussed herein and shown in FIG. 9 may be used with the formality classification model.

With respect to a given training example, e.g., a sentence, a casing feature may comprise information identifying the number of capitalized words, e.g., a number of entirely, capitalized words, in the example, a binary indicator indicating whether or not the sentence is all lower case; and a binary indicator indicating whether or not the first word is capitalized.

The punctuation feature may comprise information identifying the number of punctuation symbols, e.g., "!", " . . . ", "?", used in the example. The entity feature may comprise information identifying the numbers and types of entities, e.g., person, location, movie title, etc., in the example. The constituency feature may comprise information identifying the depth of a constituency parse tree normalized by the length of the example; and the number of times each parse tree production rule occurs in the example, normalized by the length of the example.

The dependency feature may comprise information identifying dependency tuples in a dependency parse. By way of a non-limiting example, Stanford CoreNLP, which provides a set of natural language analysis tools, can be used in identifying dependency tuples. The lexical feature may comprise information identifying word length and frequency in the example. The n-grams feature may comprise information identifying the n-grams in the training example. By way of a non-limiting example, in a case that n ranges in value from 1 to 3, the n-grams may include unigrams, bigrams, and trigrams.

The POS, feature may comprise information identifying the number of occurrences of each POS tag in the example, which may be normalized by the length of the example. The readability feature may comprise information identifying a length of the example, such as and without limitation a length in number of words or a length in number of characters in the example. In accordance with one or more embodiments, the readability feature may comprise a readability level representing as a grade level, e.g., the U.S. grade level. By way of a non-limiting example, the readability grade level can be determined in accordance with Flesh-Kincaid grade level formula.

The subjectivity feature may comprise information identifying a number of passive constructions, hedge words, first person pronouns, third person pronouns, etc. By way of a non-limiting example, TextBlob provides natural language processing tasks such as POS tagging, noun phrase extraction, sentiment analysis, classification, translation, and can be used in identifying information for the subjectivity feature. The word2Vec feature may comprise information identifying a sentence vector computed based on an average of the precomputed (via a word2vec tool) word vectors in the example.

As illustrated in the example shown in FIG. 9, linguistic features, such as the dependency and n-gram features, may be one-hot features. By way of a non-limiting example, in the case of the n-gram feature and a training example, each n-gram occurring in the example is represented in a vector as a one indicating that the training example includes the n-gram.

In the example shown in FIG. 9, the dependency feature can comprise dependency tuples. One of the examples of a dependency tuple shown in FIG. 9 is (governor, type, dependent(s)). By way of a non-limiting example, a governor has one or more words that depend therefrom, and the dependency can be further defined by a dependency type.

As with other trained models discussed herein, the machine learning algorithm used to train the formality linter's formality classification model can learn the predictivity of a feature in the feature set used with the model. By way of a non-limiting example, the machine learning algorithm can determine which of the features shown in the example of FIG. 9 are the most predictive of formality, most predictive of informality, the least predictive of formality, least predictive of informality, etc. As discussed in examples provided herein, features with higher weights can be considered to be predictive of a label, e.g., formality or informality.

FIG. 10 provides some examples of features and corresponding examples of weights which may be used in accordance with one or more embodiments of the present disclosure. In the example shown in FIG. 10, the 2-gram Dear Sir and the 3-gram I acknowledge that have determined weights (respectively) of 0.6 and 0.4, which indicate that the Dear Sir 2-gram is more predictive of formality than the 3-gram I acknowledge. With respect to informality predictivity, heeellzzyeah is the most predictive of informality with respect to the three examples.

By way of some further non-limiting examples, in the example shown in FIG. 10, and with respect to readability, longer sentences and longer words are considered to be more predictive of formality, and shorter sentences and shorter words are considered to be more predictive of informality. With respect to punctuation, a period is predictive of formality, while a series of exclamation marks or a series of question marks are considered to be predictive of informality. With respect to case, the number of words capitalized is indicative of formality, while a higher number of capitalized letters, a sentence that is all lowercase is predictive of informality.

The feature set shown in FIG. 9 and discussed above can be used to represent a message's content, e.g., a sentence, a paragraph, multiple sentences, multiple paragraphs, etc., as input to the trained formality classification model. The trained classification model can provide output indicating a level of formality of the input, e.g., one or more words, sentences, paragraphs or the message itself.

As discussed herein, a formality determination, e.g., the level of formality, may be determined at different levels of granularity, e.g., word, sentence, paragraph, message itself etc. The level of granularity used can be based on a number of factors. For example, factors such as the purpose of the message, the message's recipients, etc. may be considered. By way of a non-limiting example, if the message has a business purpose, e.g., an application for employment, or is directed to a customer, boss, etc., a formality determination might be made at the sentence level. By way of a further non-limiting example, the level of granularity of the determination can be based on user preference, a system configuration, etc.

In accordance with one or more embodiments, messages in the chain of messages including the new message currently being composed by the user may be used to determine a desired level of formality for the new message.

At steps 504, 506 and 508 of FIG. 5, a set of features representing the message's content being tested is provided to the formality classification model, which generates output used at step 508 to make a determination whether or not to provide feedback to the user. By way of a non-limiting example, the output may be in the form of a numeric value between −10 and 10, such that the larger the value is, the more formal the input. By way of a further non-limiting example, the numeric value may range between 0 and 1, between 0 and 100, etc.

At step 508, a determination is made whether or not to provide feedback to the user. The feedback determination may be made by comparing the level of formality identified by the classification model with a desired formality level. As discussed herein, a desired level of formality may be determined based on a determined purpose of the message, the message's recipient(s), a user preference, etc. If the formality level identified by the classification model is different than the desired formality level, feedback can be provided at step 510.

In the example shown in FIG. 4, the feedback 406 comprises a displayed message indicating that the email message is too informal and providing a suggestion for correction, e.g., a suggestion for the user to use a more professional tone. By way of another non-limiting example, the feedback may comprise one or more alternatives for replacing the informal language with more formal language.

In accordance with one or more embodiments, in addition to flagging an improper level of formality, the occurrence of different levels of formality, or informality, in a given message may be flagged for feedback to the user. By way of a further non-limiting example, the user may be notified that one sentences in a message is formal while another sentence is considered to be informal.

Referring again to FIG. 1, the functional linters 114 may include such linters as attachment check and greeting check linters.

In accordance with one or more embodiments, the attachment check linter can perform a check to determine whether there is an attachment error. By way of a non-limiting example, the attachment check linter can analyze a message's content to determine whether it references an attachment, and flag an error, if the message does not have an attachment. By way of a further non-limiting example, the attachment check linter can check for such expressions as "the attached", "included", "enclosed", etc., and signal the user if there is nothing attached to the message. The attachment linter can use a set of regular expressions to detect common phrases which may signal an attachment. In accordance with one or more embodiments, the phrase that triggers the error can be highlighted as part of the error's annotation. In so doing, the highlighted phrase can assist the user in determining whether an attachment is needed, what to attach, etc.

In accordance with one or more embodiments, the greeting check linter can be used to identify a mismatch between a recipient listed in a To field of the message and a recipient identified in the body of the message, e.g., in the message's greeting. By way of a non-limiting example, an email user might inadvertently specify a recipient in the To field in the email message, but reference someone else in a greeting in the email message. In accordance with one or more embodiments, regular expressions can be used to search for greeting phrases, identify the name(s) used in conjunction with any greeting phrase found, and check whether the name used in the greeting matches a recipient's name specified in the message To field.

Figure 11:
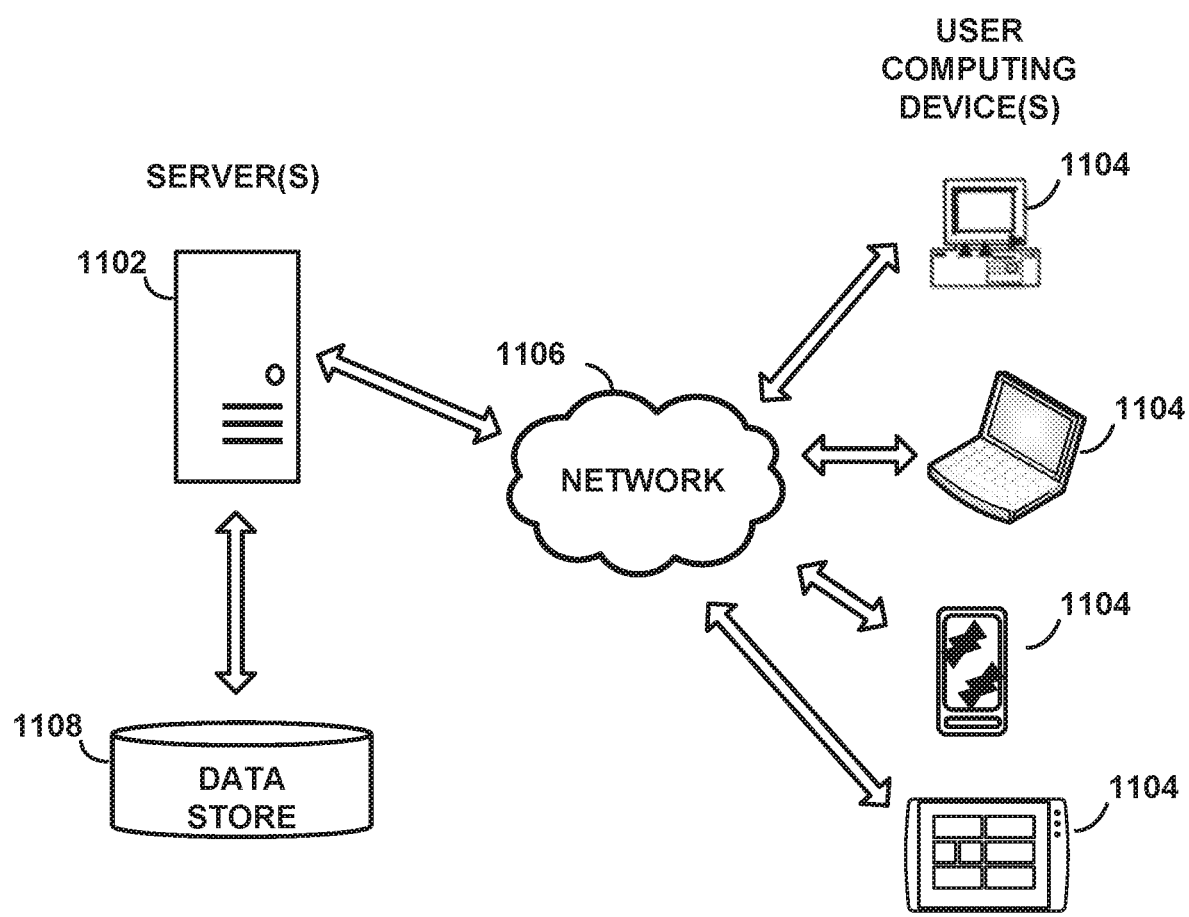
FIG. 11 illustrates some components that can be used in connection with one or more embodiments of the present disclosure.

FIG. 11 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1102 can be configured to execute program code, instructions, etc. to provide functionality in accordance with one or more embodiments of the present disclosure. The same or another computing device 1102 may be configured to execute program code to implement functionality in accordance with one or more embodiments of the present disclosure.

Computing device 1102, such as server 104, can serve content to user computing devices 1104 using a browser application via a network 1106. Data store 1108 can be used to store program code to configure a server 1102 to functionality in accordance with one or more embodiments of the present disclosure.

The user computing device 1104, such as user device 102, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1102 and the user computing device 1104 can include one or more processors, memory, a removable media reader, network interface, display and interface, and one or more input devices, e.g., keyboard, keypad, mouse, etc. and input device interface, for example. One skilled in the art will recognize that server 1102 and user computing device 1104 may be configured in many different ways and implemented using many different combinations of hardware, software, or firmware.

In accordance with one or more embodiments, a computing device 1102 can make a user interface available to a user computing device 1104 via the network 1106. The user interface made available to the user computing device 1104 can include content items, or identifiers (e.g., URLs) selected for the user interface in accordance with one or more embodiments of the present invention. In accordance with one or more embodiments, computing device 1102 makes a user interface available to a user computing device 1104 by communicating a definition of the user interface to the user computing device 1104 via the network 1106. The user interface definition can be specified using any of a number of languages, including without limitation a markup language such as Hypertext Markup Language, scripts, applets and the like. The user interface definition can be processed by an application executing on the user computing device 1104, such as a browser application, to output the user interface on a display coupled, e.g., a display directly or indirectly connected, to the user computing device 1104.

In an embodiment the network 1106 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suite as the Internet. Two of the most important elements in the suite are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 11. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 12:
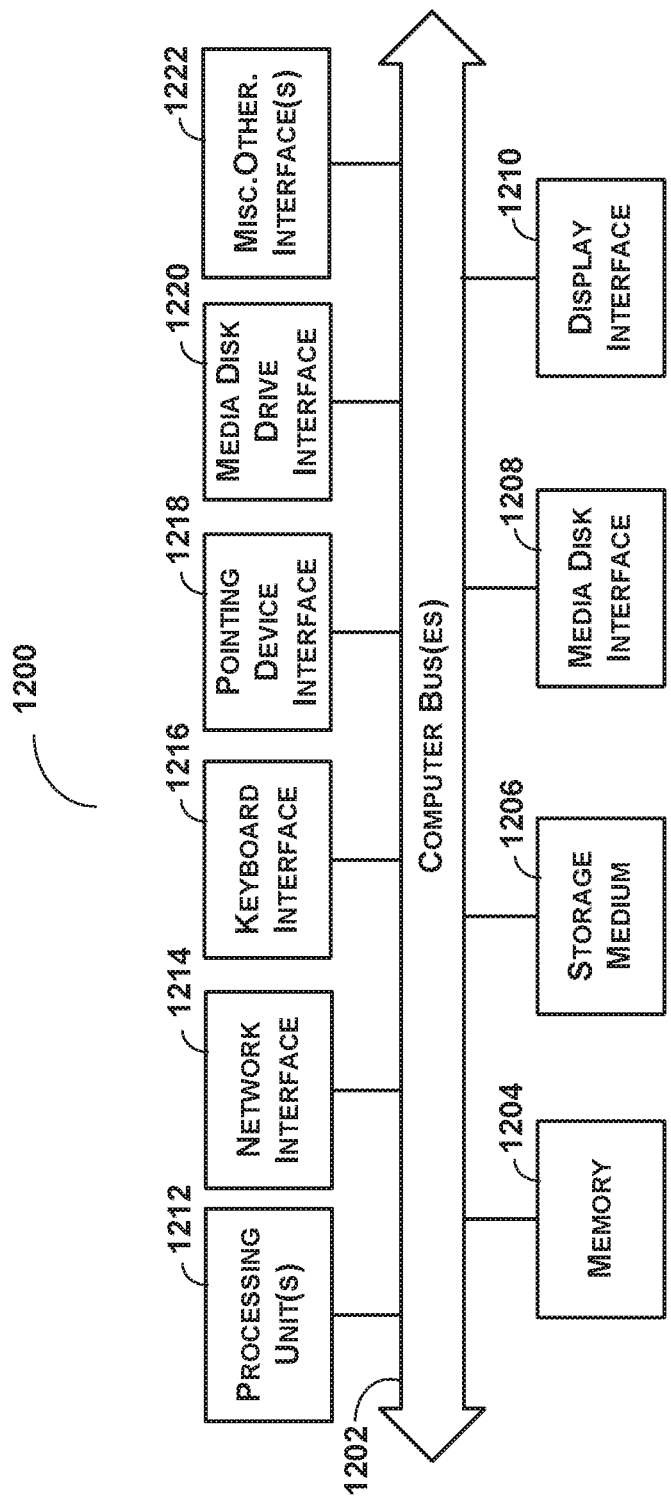
FIG. 12 is a detailed block diagram illustrating an internal architecture of a computing device in accordance with one or more embodiments of the present disclosure.

FIG. 12 is a detailed block diagram illustrating an internal architecture of a computing device, e.g., a computing device such as server 1102 or user computing device 1104, in accordance with one or more embodiments of the present disclosure. As shown in FIG. 12, internal architecture 1200 includes one or more processing units, processors, or processing cores, (also referred to herein as CPUs) 1212, which interface with at least one computer bus 1202. Als© interfacing with computer bus 1202 are computer-readable medium, or media, 1206, network interface 1214, memory 1204, e.g., random access memory (RAM), run-time transient memory, read only memory (ROM), etc., media disk drive interface 1220 as an interface for a drive that can read and/or write to media including removable media such as floppy, CD-ROM, DVD, etc. media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs, device drivers, and software modules that comprise program code, and/or computer-executable process steps, incorporating functionality described herein, e.g., one or more of process flows described herein. CPU 121.2 first loads computer-executable process steps from storage, e.g., memory 1204, computer-readable storage medium/media. 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   obtaining, by a computing device, training data comprising a number of training examples, each training example comprising a set of features and having a corresponding label indicating whether or not the example is a positive example of a condition meriting correction;
   training, by the computing device and using a machine learning algorithm, a linter using the training data, the linter for use in detecting the condition meriting correction in connection with electronic message input, of a user, the training comprising providing each training example and corresponding label as input to the machine learning algorithm to train the linter to recognize the condition meriting correction, the training comprising recognizing whether or not a feature, of the set of features, is a predictive feature of the condition meriting correction;
   generating, by the computing device, feature set input comprising the set of features generated using the electronic message input, of the user, the feature set input for use by the linter in detecting the condition meriting correction;
   making a determination, by the computing device and using the linter, that the condition meriting correction exists with the electronic message input, the condition comprising a stylistic condition, the determining comprising:
      providing the feature set input as input to the linter trained using the machine learning algorithm and each of the training examples comprising the set of features; and
      receiving output, from the linter, the output comprising a probability being used to make the determination identifying a style;
   generating, by the computing device, feedback indicative of the stylistic condition in accordance with the determination, the feedback specifying both the style determined by the linter and a recommended style to use instead, the feedback suggesting that, prior to sending, the user change to the different style for the electronic message; and
   displaying, via the computing device, the feedback to the user.

2. The method of claim 1, further comprising:
   testing, by the computing device, the linter using a number of test data examples comprising a number of examples from the training data excluding the corresponding label, the testing comprising providing each test data example to the linter, the testing indicating a level of accuracy of the linter in detecting the condition.

3. The method of claim 1, further comprising training a confused-word linter for use with a pair of confused words, the number of training examples, of the training data for training the confused-word linter, comprising a first set of training examples and a second set of training examples, each example in the first set comprising the set of features and having a label identifying a first word in the confused word pair and each example in the second set comprising the set of features and having a label identifying a second word in the confused word pair.

4. The method of claim 3, the set of features comprising a number of n-gram features, in a case of the first set of training examples, an n-gram feature, of the number of n-gram features, comprising a number of words to the left and a number of words to the right of the first word in the confused-word pair, in the case of the second set of training examples, an n-gram feature, of the number of n-gram features, comprising a number of words to the left and a number of words to the right of the second word in the confused-word pair.

5. The method of claim 3:
the providing further comprising providing, as the feature set input corresponding to the electronic message input, at least one feature comprising an n-gram determined from the electronic message input; and
the receiving further comprising receiving output comprising a prediction indicating which word of the confused-word pair is correctly used in the electronic message input;
the generating feedback further comprising generating feedback in a case that the electronic message input includes an incorrectly-used word based on the received output from the linter.

6. The method of claim 1, the linter is a stylistic linter, for each training example, of the number of training examples, the set of features comprising at least one n-gram, each n-gram being associated with a label indicating whether or not the example is a positive stylistic example.

7. The method of claim 6, n is variable, such that a value of n for one n-gram differs from the value of n for at least one other n-gram.

8. The method of claim 6:
the providing further comprising providing, as the feature set input corresponding to the electronic message input, at least n-gram determined from the electronic message input; and
the receiving further comprising receiving output comprising a prediction indicating whether or not a stylistic condition exists in the electronic message input.

9. The method of claim 6, the stylistic linter is selected from the group consisting of a hate linter, a sentiment linter, a satire linter, sarcasm linter, or an abusive language linter.

10. The method of claim 1, the linter is a formality linter for use in identifying a mismatch between a determined level of formality of content of the electronic message input and a desired level of formality, for each training example, of the number of training examples, the set of features comprising a number of natural language processing features representing content of the training example and a corresponding label indicating a level of formality for the training example.

11. The method of claim 10, for each training example, of the number of training examples, the set of features comprising a number of case features, a number of punctuation features, a number of readability features, a number of subjectivity features, a number of parts-of-speech (POS) features, a number of dependency features, a number of entity features and a number of word2vec features.

12. The method of claim 10:
the providing further comprising providing, as the feature set input corresponding to the electronic message input, a number of features representing content of at least a portion of the electronic message input determined from the electronic message input; and
the receiving further comprising receiving output comprising a prediction indicating level of formality corresponding to the electronic message input;
the generating feedback further comprising generating feedback indicating that the level of formality and the desired level of formality are a mismatch.

13. A non-transitory computer-readable storage medium tangibly encoded with computer-executable instructions that when executed by a processor associated with a computing device perform a method comprising:
obtaining training data comprising a number of training examples, each training example comprising a set of features and having a corresponding label indicating whether or not the example is a positive example of a condition meriting correction;
training, using a machine learning algorithm, a linter using the training data, the linter for use in detecting the condition meriting correction in connection with electronic message input, of a user, the training comprising providing each training example and corresponding label as input to the machine learning algorithm to train the linter to recognize the condition meriting correction, the training comprising recognizing whether or not a feature, of the set of features, is a predictive feature of the condition meriting correction;
generating feature set input comprising the set of features generated using the electronic message input, of the user, the feature set input for use by the linter in detecting the condition meriting correction;
making a determination, using the linter, that the condition meriting correction exists with the electronic message input, the condition comprising a stylistic condition, the determining comprising:
providing the feature set input as input to the linter trained using the machine learning algorithm and each of the training examples comprising the set of features; and
receiving output, from the linter, the output comprising a probability being used to make the determination identifying a style;
generating feedback indicative of the stylistic condition meriting correction in accordance with the determination, the feedback specifying both the style determined by the linter and a recommended style to use instead, the feedback suggesting that, prior to sending, the user change to the different style for the electronic message; and
displaying the feedback to the user.

14. The non-transitory computer-readable storage medium of claim 13, further comprising training a confused-word linter for use with a pair of confused words, the number of training examples, of the training data for training the confused-word linter, comprising a first set of training examples and a second set of training examples, each example in the first set comprising the set of features and having a label identifying a first word in the confused word pair and each example in the second set comprising the set of features and having a label identifying a second word in the confused word pair.

15. The non-transitory computer-readable storage medium of claim 14:
the providing further comprising providing, as the feature set input corresponding to the electronic message input, at least one feature comprising an n-gram determined from the electronic message input; and
the receiving further comprising receiving output comprising a prediction indicating which word of the confused-word pair is correctly used in the electronic message input;
the generating feedback further comprising generating feedback in a case that the electronic message input includes an incorrectly-used word based on the received output from the linter.

16. The non-transitory computer-readable storage medium of claim 13, the linter is a stylistic linter, for each training example, of the number of training examples, the set of features comprising at least one n-gram, each n-gram being associated with a label indicating whether or not the example is a positive stylistic example.

17. The non-transitory computer-readable storage medium of claim 16:
the providing further comprising providing, as the feature set input corresponding to the electronic message input, at least n-gram determined from the electronic message input; and
the receiving further comprising receiving output comprising a prediction indicating whether or not a stylistic condition exists in the electronic message input.

18. The non-transitory computer-readable storage medium of claim 13, the linter is a formality linter for use in identifying a mismatch between a determined level of formality of content of the electronic message input and a desired level of formality, for each training example, of the number of training examples, the set of features comprising a number of natural language processing features representing content of the training example and a corresponding label indicating a level of formality for the training example.

19. The non-transitory computer-readable storage medium of claim 18:
the providing further comprising providing, as the feature set input corresponding to the electronic message input, a number of features representing content of at least a portion of the electronic message input determined from the electronic message input; and
the receiving further comprising receiving output comprising a prediction indicating level of formality corresponding to the electronic message input;
the generating feedback further comprising generating feedback indicating that the level of formality and the desired level of formality are a mismatch.

20. A computing device comprising:
a processor;
a non-transitory storage medium for tangibly storing thereon program logic for execution by the processor, the program logic comprising:
obtaining logic executed by the processor for obtaining training data comprising a number of training examples, each training example comprising a set of features and having a corresponding label indicating whether or not the example is a positive example of a condition meriting correction;
training logic executed by the processor for training, using a machine learning algorithm, a linter using the training data, the linter for use in detecting the condition meriting correction in connection with electronic message input, of a user, the training comprising providing each training example and corresponding label as input to the machine learning algorithm to train the linter to recognize the condition meriting correction, the training comprising recognizing whether or not a feature, of the set of features, is a predictive feature of the condition meriting correction;
generating logic executed by the processor for generating feature set input comprising the set of features generated using the electronic message input, of the user, the feature set input for use by the linter in detecting the condition meriting correction;
making logic executed by the processor for making a determination, using the linter, that the condition meriting correction exists with the electronic message input, the condition comprising a stylistic condition, the determining comprising:
providing the feature set input as input to the linter trained using the machine learning algorithm and each of the training examples comprising the set of features; and
receiving output, from the linter, the output comprising a probability being used to make the determination identifying a style;
generating logic executed by the processor for generating feedback indicative of the stylistic condition meriting correction in accordance with the determination, the feedback specifying both the style determined by the linter and a recommended style to use instead, the feedback suggesting that, prior to sending, the user change to the different style for the electronic message; and
displaying logic executed by the processor for displaying the feedback to the user.

* * * * *